United States Patent
Morimoto et al.

(10) Patent No.: US 6,944,358 B2
(45) Date of Patent: Sep. 13, 2005

(54) IMAGE PROCESSOR

(75) Inventors: Kazuya Morimoto, Osaka (JP); Takashi Matsutani, Osaka (JP); Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 666 days.

(21) Appl. No.: 10/021,349

(22) Filed: Dec. 19, 2001

(65) Prior Publication Data

US 2002/0118894 A1 Aug. 29, 2002

(30) Foreign Application Priority Data

Feb. 26, 2001 (JP) .......................... 2001-050032

(51) Int. Cl.[7] .................... G06K 9/54; G06K 9/60
(52) U.S. Cl. .................... 382/304; 382/302; 382/303
(58) Field of Search .............................. 382/304, 305, 382/282, 284, 303, 302

(56) References Cited

U.S. PATENT DOCUMENTS

| | | | | |
|---|---|---|---|---|
| 5,892,851 A | * | 4/1999 | Nguyen | 382/252 |
| 6,370,279 B1 | * | 4/2002 | Paik | 382/268 |
| 6,400,849 B1 | * | 6/2002 | Lee et al. | 382/260 |

FOREIGN PATENT DOCUMENTS

| | | |
|---|---|---|
| JP | 7-306671 | 11/1995 |
| JP | 8-154169 | 6/1996 |
| JP | 2000-236473 | 8/2000 |

* cited by examiner

*Primary Examiner*—Amelia M. Au
*Assistant Examiner*—Wes Tucker
(74) *Attorney, Agent, or Firm*—Oblon, Spivak, McClelland, Maier & Neustadt, P.C.

(57) ABSTRACT

Image dividing means of an RPU divides raw image data into divided image data A1 having 2048 horizontal pixels and A2 having 1024 horizontal pixels. The divided image data A1 is continuously processed in single pixel processing means and multiple pixel processing means and thereafter transferred to and stored in a buffer. The divided image data A2 is processed in the single pixel processing means and thereafter transferred to and temporarily stored in another buffer. The multiple pixel processing means reads and processes divided image data A2a stored in this buffer and thereafter transfers and stores the same to and in still another buffer. Image combining means reads divided image data A1b and A2b stored in the buffers and combines the same with each other. Thus, an image processing time and a cost can be reduced even if raw image data having horizontal pixels in a number exceeding the capacity of a line memory is received.

7 Claims, 10 Drawing Sheets

IMAGE PROCESSOR

BACKGROUND OF THE INVENTION

1. Field of the Invention

The present invention relates to an image processor loaded on a digital camera or the like.

2. Description of the Background Art

FIG. 10 is a schematic block diagram of a general digital still camera 100. In the digital still camera 100, an analog image signal picked up with an image pickup sensor 105 such as a CCD sensor or a CMOS sensor is converted to a digital signal and thereafter subjected to various image processing such as gamma correction, color space conversion, pixel interpolation and edge enhancement in an image processing part 106, as shown in FIG. 10. Image data subjected to such image processing is finder-displayed on a liquid crystal monitor 109, compression-coded in the JPEG (joint photographic experts group) system or the TIFF (tag image file format) and stored in a storage medium (memory card) 110 formed by a nonvolatile memory or the like, or output to an external device such as a personal computer or a printer through an interface 111. Referring to FIG. 10, numeral 101 denotes an optical lens, numeral 102 denotes a color correction filter, numeral 103 denotes an optical LPF (low-pass filter), numeral 104 denotes a color filter array, and numeral 107 denotes a driving part driving/controlling the image pickup sensor 105.

In general, image processing in the image processing part 106 is classified into image processing such as gamma correction or color space conversion in units of single pixels and image processing such as pixel interpolation or edge enhancement in units of multiple pixels. In the image processing in units of multiple pixels, processed data of a specific pixel is created from a plurality of pixel data surrounding the specific pixel, and hence pixel data of a plurality of horizontal lines must be stored in line memories (not shown). Therefore, a plurality of line memories each having capacity at least corresponding to the number of horizontal pixels of the image pickup sensor 105 are prepared in general. However, the pixel size (pixel number) of the image pickup sensor 105 is not uniform. When the capacity of the line memories is matched with a popular pixel size, therefore, the image processing in units of multiple pixels cannot be executed on an image sensor having a larger pixel size. When the capacity of the line memories built into an image processing circuit integrated into a chip is increased, power consumption as well as the chip size and the manufacturing cost are disadvantageously increased.

FIG. 11 is a schematic block diagram for illustrating an image processing method solving the aforementioned problem. Referring to FIG. 11, it is assumed that raw image data input in the image processing part 106 has 3072 horizontal pixels exceeding the capacity, corresponding to 2048 horizontal pixels, of line memories (not shown) provided in an RPU (real-time processing unit) 106A of the image processing part 106. The image processing part 106 comprises the RPU 106A image-processing progressive (sequential scanning) type raw image data in real time. The RPU 106A is integrated into a chip, and comprises pixel processing means 106Aa performing image processing such as gamma correction, pixel interpolation and color space conversion on the raw image data transferred from a raw image data buffer 108a.

First, raw image data picked up with the image pickup sensor 105 is temporarily transferred to and stored in the raw image data buffer 108a provided on a memory 108 (ST100). At subsequent steps ST101 and ST102, pixel data are read from the raw image data buffer 108a as divided image data A1 having 2048 horizontal pixels and divided image data A2 having 1024 horizontal pixels and transferred to the RPU 106A. At the step ST101, the divided image data A1 is read from the raw image data buffer 108a, transferred to the pixel processing means 106Aa and subjected to image processing in units of single pixels and in units of multiple pixels, and thereafter transferred to and stored in a processed data buffer 108b. At the subsequent step ST102, the divided image data A2 is read from the raw image data buffer 108a, transferred to the pixel processing means 106Aa and subjected to image processing, and thereafter transferred to and stored in another processed data buffer 108c.

At a subsequent step ST103, divided image data A1a and A2a stored in the processed data buffers 108b and 108c respectively are transferred to image combining means 106B and thereafter combined with each other into image data of one frame.

A CPU 106C compression-codes the image data output from the image combining means 106B by the JPEG system or the like (ST104), and stores the same in the storage medium (memory card) 110 (ST105).

In such image processing, however, the RPU 106A must store a plurality of lines of the divided image data A1 and A2 in the line memory when the pixel processing means 106Aa performs the processing in units of multiple pixels, and temporally independently process the divided image data A1 and A2. Thus, the raw image data of one frame is temporarily stored in the raw image data buffer 108a so that the divided image data A1 and A2 are thereafter transferred to the RPU 106A, and hence the capacity of the memory 108 is increased to disadvantageously increase the cost as well as the image processing time. Therefore, the processing time required for ending writing of the compression-coded image in the storage medium 110 after the operator presses a shutter release button is disadvantageously increased, for example.

SUMMARY OF THE INVENTION

According to a first aspect of the present invention, an image processor comprises an image processing circuit image-processing image data input therein and a main memory receiving and temporarily storing the transferred data processed in the image processing circuit and transferred thereto, while the image processing circuit has a temporary storage area temporarily storing pixel data of a plurality of lines of the image data, image dividing means dividing the image data into divided image data storable in the temporary storage area, single pixel processing means executing image processing on the divided image data in units of single pixels and multiple pixel processing means executing image processing in units of multiple pixels after the temporary storage area stores the divided image data processed in the single pixel processing means, and the main memory has a first buffer area storing first divided image data continuously processed in the single pixel processing means and the multiple pixel processing means among the divided image data, a second buffer area storing second divided image data processed in the single pixel processing means among the divided image data and a third buffer area storing data obtained by processing the second divided image data read from the second buffer area in the multiple pixel processing means. The image processor further comprises image combining means combining the first divided image data stored in the first buffer area and the data stored in the third buffer area with each other.

As hereinabove described, the image processor according to the first aspect requires no step of temporarily storing the image data in the main memory and thereafter transferring the same to the aforementioned image processing circuit dissimilarly to the prior art even if the aforementioned temporary storage area such as a line memory has no capacity for horizontal pixel number of the received raw image data, whereby the image processing speed can be improved and the buffer area on the main memory can be saved for reducing the manufacturing cost.

According to a second aspect of the present invention, a CPU (central processing unit) controls data transfer between the main memory and the image processing circuit.

According to the second aspect, the CPU can execute data transfer between the aforementioned main memory and the aforementioned image processing circuit.

According to a third aspect of the present invention, the image processor further comprises a DMA (direct memory access) controller controlling data transfer between the main memory and the image processing circuit.

According to the third aspect, the load on the CPU is reduced and data transfer between the aforementioned main memory and the aforementioned image processing circuit can be executed at a high speed, whereby the image processing speed can be further improved.

According to a fourth aspect of the present invention, the DMA controller has at least two DMA channels, the first DMA channel is assigned to data transfer from the multiple pixel processing means to the first buffer area and the second DMA channel is assigned to data transfer from the single pixel processing means to the second buffer area.

According to the fourth aspect, the first divided image data processed in the aforementioned multiple pixel processing means can be DMA-transferred to the aforementioned first buffer area and the second divided image data processed in the aforementioned single pixel processing means can be DMA-transferred to the aforementioned second buffer area, whereby image processing is so efficiently executed that the image processing speed can be improved.

According to a fifth aspect of the present invention, the DMA controller has at least two DMA channels, the first DMA channel is assigned to data transfer from the second buffer area to the multiple pixel processing means and the second DMA channel is assigned to data transfer from the multiple pixel processing means to the third buffer area.

According to the fifth aspect, the second divided image data stored in the aforementioned second buffer area can be DMA-transferred to the aforementioned multiple pixel processing means while the data processed in the multiple pixel processing means can be DMA-transferred to the aforementioned third buffer area in parallel therewith, whereby image processing is so efficiently executed that the image processing speed can be improved.

According to a sixth aspect of the present invention, an image processor comprises an image processing circuit image-processing raw image data input therein, a main memory receiving and temporarily storing the data processed in the image processing circuit and transferred thereto and a DMA controller controlling data transfer between the main memory and the image processing circuit, while the image processing circuit has a temporary storage area temporarily storing pixel data of a plurality of lines of the raw image data, image dividing means dividing the raw image data into divided image data storable in the temporary storage area, single pixel processing means executing image processing on the divided image data in units of single pixels and multiple pixel processing means executing image processing in units of multiple pixels after the temporary storage area stores the divided image data processed in the single pixel processing means, the main memory has a first buffer area storing first divided image data continuously processed in the single pixel processing means and the multiple pixel processing means among the divided image data and a second buffer area storing second divided image data processed in the single pixel processing means among the divided image data, the first buffer area also stores data obtained by processing the second divided image data read from the second buffer area in the multiple pixel processing means, and the DMA controller makes addressing when transferring the first and second divided image data to the first buffer area thereby combining the same into a single image and storing the single image.

According to the sixth aspect, the image processor requires no step of temporarily storing the raw image data in the main memory and thereafter transferring the same to the aforementioned image processing circuit dissimilarly to the prior art even if the aforementioned temporary storage area such as a line memory has no capacity for horizontal pixel number of the received raw image data similarly to the first aspect, whereby the image processing speed can be improved and the buffer area on the main memory can be saved for reducing the manufacturing cost. Further, the aforementioned divided image data can be combined in DMA transfer, whereby the divided image data can be combined at a high speed for improving the image processing speed.

According to a seventh aspect of the present invention, the DMA controller comprises a DMA channel generating and outputting an address on the main memory and a memory control circuit executing data transfer between a storage element corresponding to the address output from the DMA channel and the image processing circuit, and the DMA channel comprises an address counter generating and outputting the address by sequentially changing the same from a prescribed start address in the first buffer area up to a prescribed end address in the first buffer area, a local counter performing counting in synchronization with sequential change of the address in the address counter and an adder-subtracter outputting an added/subtracted value obtained by adding/subtracting a prescribed offset value to/from the address output from the address counter when a count output from the local counter reaches a prescribed final value to the address counter thereby making the address counter change the address from the added/subtracted value.

According to the seventh aspect, the aforementioned start address, end address, final value and offset value are properly specified when the first divided image data is DMA-transferred from the multiple pixel processing means to the aforementioned first buffer area and the second divided image data is DMA-transferred from the multiple pixel processing means to the aforementioned first buffer area respectively, whereby the first and second divided image data can be combined into a single image and stored in the first buffer area.

Accordingly, an object of the present invention is to provide an image processor capable of reducing an image processing time as well as a cost also when receiving raw image data having horizontal pixels in a number exceeding the capacity of the aforementioned line memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Image processing methods according to various embodiments of the present invention are now described.

Overall Structure.

Figure 1:
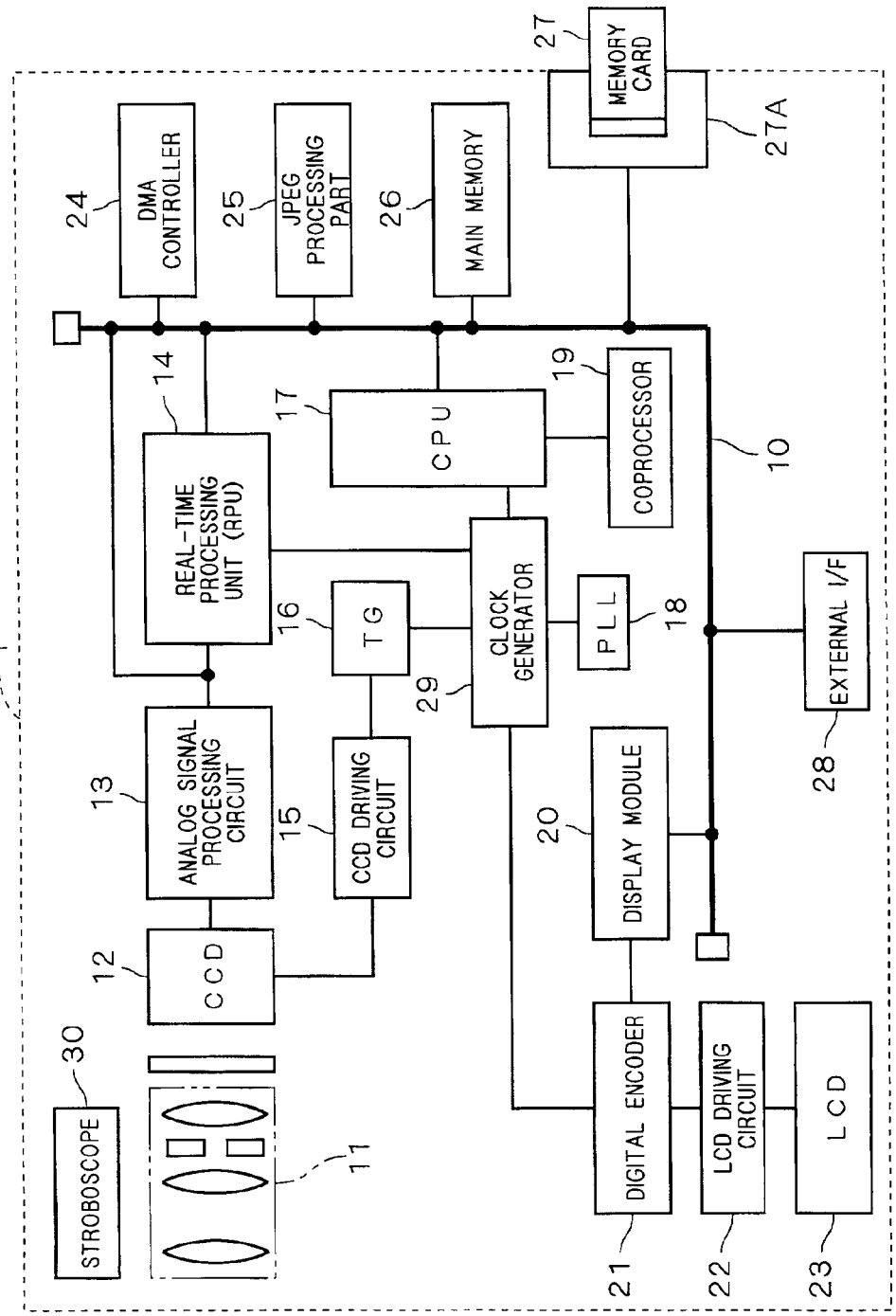
FIG. 1 is a schematic diagram showing the overall structure of a digital still camera employed in embodiments of the present invention.

FIG. 1 is a schematic diagram showing the overall structure of a digital still camera 1 employed in each embodiment of the present invention. This digital still camera 1 comprises an optical mechanism 11 having an AF (auto-focus) function, an automatic exposure control function and the like, and a CCD (charge-coupled device) sensor 12 picks up an image of an object through the optical mechanism 11. At this time, a stroboscope (flash) 30 may emit light of a controlled quantity in synchronization with the pickup timing for applying the same to the object. An analog signal processing circuit 13 captures the picked-up analog image data of the object and converts the same to a digital image signal (raw image data). An RPU (real-time processing unit) 14 performs prescribed image processing such as pixel interpolation, color space conversion, gamma correction, edge enhancement and filtering on the raw image data as real-time processing. The image data subjected to such image processing is displayed on an LCD 23 functioning as a finder, or subjected to compression coding in the JPEG system or the TIFF by a CPU 17 and thereafter transferred to a card interface 27A and stored in a memory card 27 through a main bus 10 or transferred to an external interface (I/F) 28 and output to an external device such as a personal computer.

A main memory 26 is interconnected with the analog signal processing circuit 13, the RPU 14, a DMA controller (data transfer controller) 24 and a JPEG processing part 25 through the main bus 10. The CPU 17 or the DMA controller 24 controls data transfer between the analog signal processing circuit 13 and the main memory 26 or between the RPU 14 and the main memory 26.

Referring to FIG. 1, numeral 15 denotes a CCD driving circuit driving the CCD sensor 12, numeral 16 denotes a timing generator regulating operation timings of the RPU 14, the CCD driving circuit 15 and the like, numeral 18 denotes a PLL oscillation circuit, numeral 19 denotes an auxiliary arithmetic unit (coprocessor) for the CPU 17, numeral 20 denotes a display module, numeral 21 denotes a digital encoder, and numeral 22 denotes an LCD driving circuit driving the LCD 23. A clock generator 29 divides or multiplies a clock signal supplied from the PLL oscillation circuit 18, thereby generating a driving clock signal for all modules such as the RPU 14, the timing generator 16, the CPU 17, the digital encoder 21 and the like.

Embodiment 1.

Figure 2:
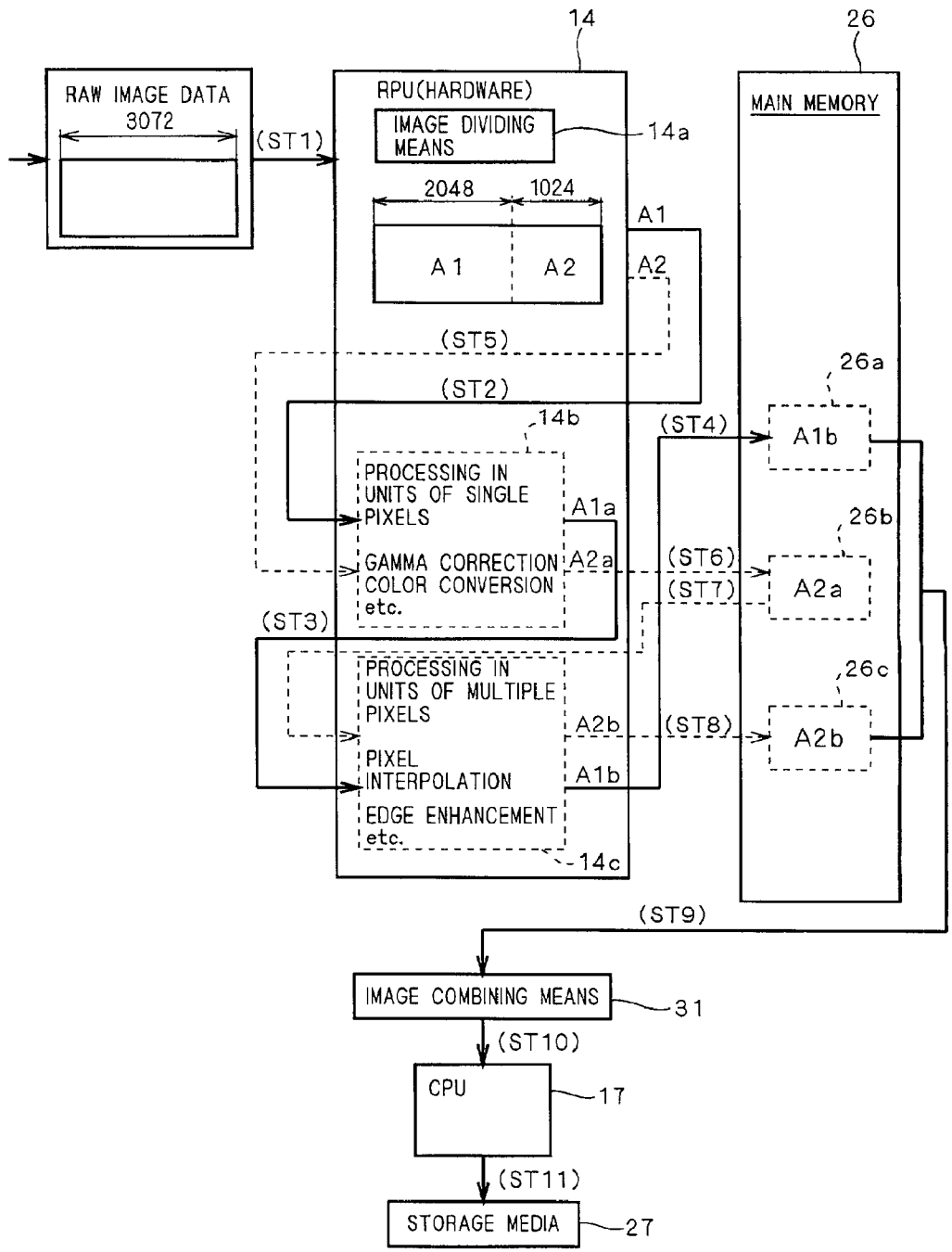
FIG. 2 is a schematic block diagram for illustrating an image processor according to an embodiment 1 of the present invention.

FIG. 2 is a schematic block diagram for illustrating an image processor according to an embodiment 1 of the present invention. As shown in FIG. 2, the image processor according to the embodiment 1 comprises an RPU (image processing circuit) 14 integrated into a chip, a main memory 26 and image combining means 31. The RPU 14 carries a plurality of line memories (not shown) each having a capacity for 2048 horizontal pixels.

The RPU 14 comprises image dividing means 14a dividing raw image data having 3072 horizontal pixels input in a progressive system into first divided image data A1 having 2048 horizontal pixels and second divided image data A2 having 1024 horizontal pixels as well as single pixel processing means 14b and multiple pixel processing means 14c image-processing the divided image data A1 and A2 output from the image dividing means 14a in units of single pixels and in units of multiple pixels respectively.

Examples of the image processing in units of single pixels are gamma correction for correcting gamma characteristics, color space conversion for converting image data expressed in a three-color system (RGB system) or a four-color system (YMCG system or the like) to other color space components when an original signal is a color image signal, and the like. Examples of a color space coordinate system after color space conversion are a YUV coordinate system, a YIQ coordinate system, a $YC_bC_r$ coordinate system etc. employed in the NTSC (national television system committee) system or the like. Examples of the image processing in units of multiple pixels are pixel interpolation, edge enhancement and the like. For example, a Bayer image pickup sensor assigns a monochromatic filter to each pixel, and hence raw image data picked up with this image pickup sensor has only a single color component as to each pixel. In pixel interpolation, pixel data of deficient color components must be interpolated from data of peripheral pixels on three to five horizontal lines including that having the pixel. Therefore, the RPU 14 has a plurality of line memories (not shown) described above.

An image processing method according to the embodiment 1 is now described in detail. At a step ST1, an image signal output from the aforementioned CCD sensor 12 driven in the progressive system is converted to a digital signal (raw image data) in the analog signal processing circuit 13 and thereafter directly input in the image dividing means 14a of the aforementioned RPU 14 without being temporarily transferred to the main memory 26. The image dividing means 14a divides the received raw image data having 3072 horizontal pixels into the first divided image data A1 having 2048 horizontal pixels and the second divided image data A2 having 1024 horizontal pixels and outputs the same to the single pixel processing means 14b.

At a subsequent step ST2, the single pixel processing means 14b performs real-time processing in units of single pixels on the first divided image data A1 and thereafter continuously outputs the same to the multiple pixel processing means 14c. At a subsequent step ST3, the multiple pixel processing means 14c stores received divided image data A1a in the aforementioned line memories for a plurality of lines, executes real-time processing in units of multiple pixels and thereafter outputs the same. At a step ST4, divided image data A1b output from the multiple pixel processing means 14c is transferred to and stored in a first buffer area 26a provided on the main memory 26 through the main bus 10 under control of the CPU 17. At a step ST5, the single pixel processing means 14b performs image processing in units of single pixels on the divided image data A2 received from the image dividing means 14a and outputs divided image data A2a, which in turn is transferred to and stored in a second buffer area 26b through the main bus 10 under control of the CPU 17 at a subsequent step ST6.

In actual division, the aforementioned image dividing means 14a identifies the area of the divided image data A1 or A2 to which received pixel data belongs, and generates an identification signal therefor to the single pixel processing means 14b. The single pixel processing means 14b switches the destination of the processed data in response to the identification signal. In other words, the single pixel processing means 14b outputs the processed data A1a to the multiple pixel processing means 14c (ST3) when the pixel data belongs to the divided image data A1, while outputting the processed data A2a to the second buffer area 26b when the pixel data belongs to the divided image data A2 (ST6).

After the processing at the aforementioned steps ST1 to ST6 is ended, the multiple pixel processing means 14c outputs divided image data A2b obtained by reading the divided image data A2a stored in the second buffer area 26b and executing real-time processing in units of multiple pixels at a step ST7. At a step ST8, the divided image data A2b output from the multiple pixel processing means 14c is transferred to and stored in a third buffer area 26c through the main bus 10 under control of the CPU 17 in parallel with the aforementioned step ST7.

At a subsequent step ST9, the image combining means 31 reads the divided image data A1b stored in the first buffer area 26a and the divided image data A2b stored in the third buffer area 26c for combining these divided image data A1b and A2b with each other and outputting combined image data to the CPU 17. The image combining means 31 may be built into the RPU 14 as a hardware structure, or provided in the mode of software executed by the CPU 17. The CPU 17 compression-codes the combined image data received from the image combining means 31 in the JPEG system or the TIFF by software processing (ST10), and transfers and stores the compression-coded data to and in the memory card 27 through the aforementioned card interface 27A (ST11).

Thus, the image processing according to the embodiment 1 requires no step of temporarily storing the raw image data of the progressive system in the main memory 26 and thereafter transferring the same to the aforementioned RPU 14 dissimilarly to the aforementioned prior art, whereby the image processing speed can be improved and the buffer areas provided on the main memory 26 can be saved for reducing the manufacturing cost.

Embodiment 2.

Figure 3:
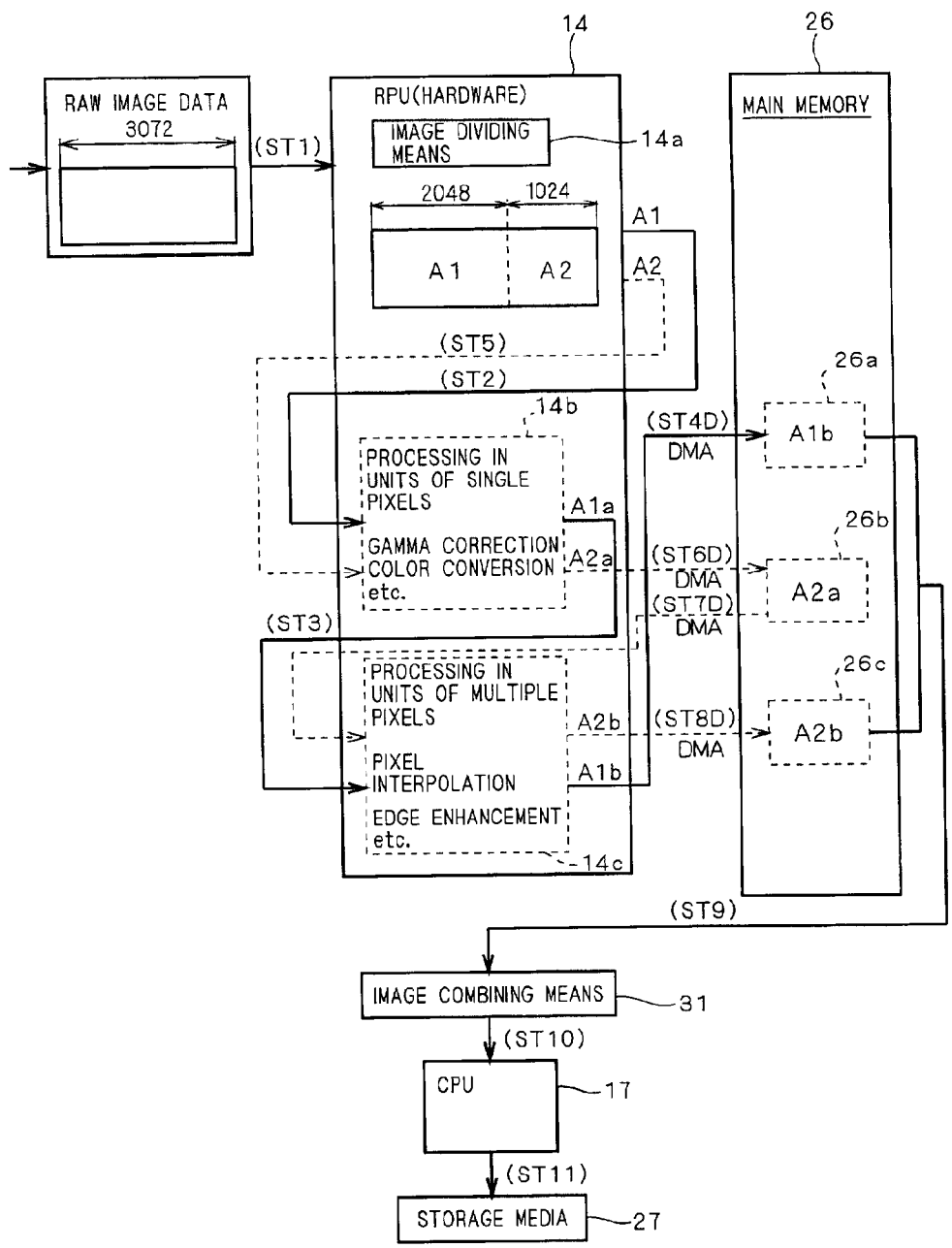
FIG. 3 is a schematic block diagram for illustrating an image processor according to an embodiment 2 of the present invention.

In order to reduce the load on the CPU 17 and improve the image processing speed, it is preferable to employ the aforementioned DMA controller 24 for data transfer between the RPU 14 and the main memory 26. FIG. 3 is a schematic block diagram for illustrating an image processor according to an embodiment 2 of the present invention employing a DMA controller 24. Referring to FIG. 3, blocks denoted by the same reference numerals as those in FIG. 2 are assumed to have functions similar to the above, and redundant description is omitted. This also applies to step numbers shown in FIG. 3.

Figure 4:
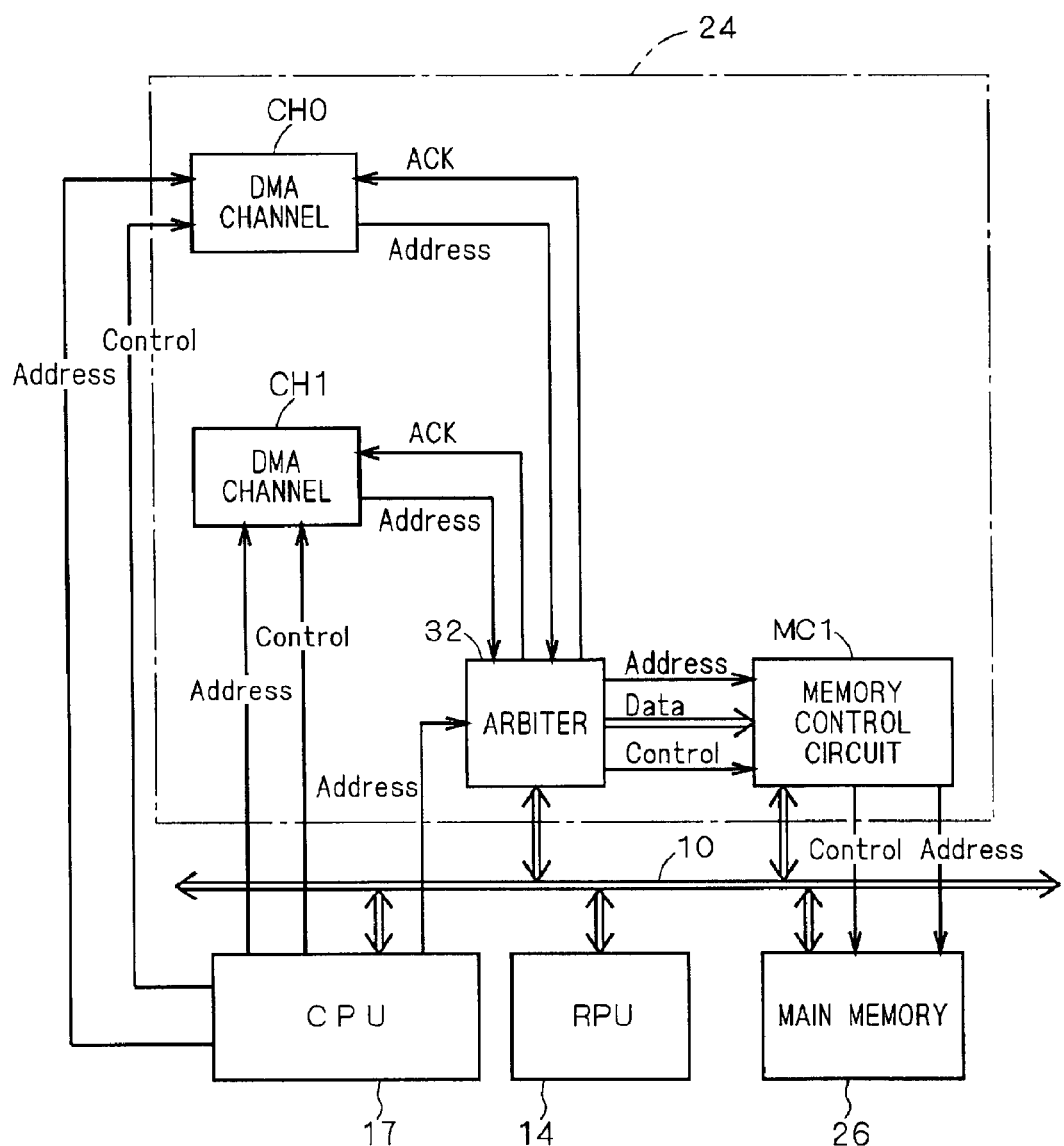
FIG. 4 is a block diagram schematically showing the structure of a DMA controller employed in the image processor according to the embodiment 2 of the present invention.

FIG. 4 is a block diagram schematically showing the structure of the DMA controller 24. This DMA controller 24 comprises an arbiter (arbitration circuit) 32, a memory control circuit MC1 and two DMA channels CH0 and CH1. The arbiter 32 and the memory control circuit MC1 are connected to a main bus 10. DMA transfer processing by this DMA controller 24 is as follows: When receiving a DMA transfer request from an RPU 14, the arbiter 32 outputs an operating signal ACK to the DMA channel CH0 (or CH1) thereby assigning the DMA channel CH0 (or CH1) to data transfer between the RPU 14 and a buffer area provided on the main memory 26. When the arbiter 32 simultaneously receives a plurality of DMA transfer requests or the CPU 17 accesses the main memory 26, the arbiter 32 decides the priority of the DMA transfer requests according to a predetermined rule and outputs the operating signal ACK along this priority. The DMA channel CH0 (or CH1) receiving the operating signal ACK sequentially generates an address on the buffer area and outputs the same to the arbiter 32.

The arbiter 32 outputs a control signal allowing the memory control circuit MC1 to use the main bus 10 and the address received from the DMA channel CH0 (or CH1). The memory control circuit MC1 acquires the main bus 10 due to the aforementioned control signal and makes control to DMA-transfer data stored in the address on the buffer area to the RPU 14 or DMA-transfer data from the RPU 14 to the address on the buffer area.

According to the embodiment 2, the DMA channel CH0 is assigned to data transfer from multiple pixel processing means 14c to a first buffer area 26a at a step ST4D subsequent to a step similar to the aforementioned step ST3 described with reference to the embodiment 1, while the DMA channel CH1 is assigned to data transfer from single pixel processing means 14b to a second buffer area 26d at a step ST6D subsequent to a step similar to the aforementioned step ST5. Thus, divided image data A1b output from the multiple pixel processing means 14c can be DMA-transferred to and stored in the first buffer area 26a at the step ST4D, while divided image data A2a output from the single pixel processing means 14b can be DMA-transferred to and stored in the second buffer area 26b at the step ST6D.

After the processing at the steps ST4D and ST6D is ended, the DMA channel CH0 is assigned to data transfer from the second buffer area 26b to the multiple pixel processing means 14c at a step ST7D while the DMA channel CH1 is assigned to data transfer from the multiple pixel processing means 14c to a third buffer area 26c at a step ST8D. Thus, divided image data A2a stored in the second buffer area 26b is DMA-transferred to the multiple pixel processing means 14c at the step ST7D, while divided image data A2b output from the multiple pixel processing means 14c can be DMA-transferred to and stored in the third buffer area 26c at the step ST8D in parallel therewith.

Thus, the embodiment 2 switches assignment of the DMA channels CH0 and CH1 at the steps ST4D and ST6D and the steps ST7D and ST8D for executing DMA transfer, whereby the RPU 14 can efficiently execute image processing for improving the image processing speed.

Embodiment 3.

Figure 5:
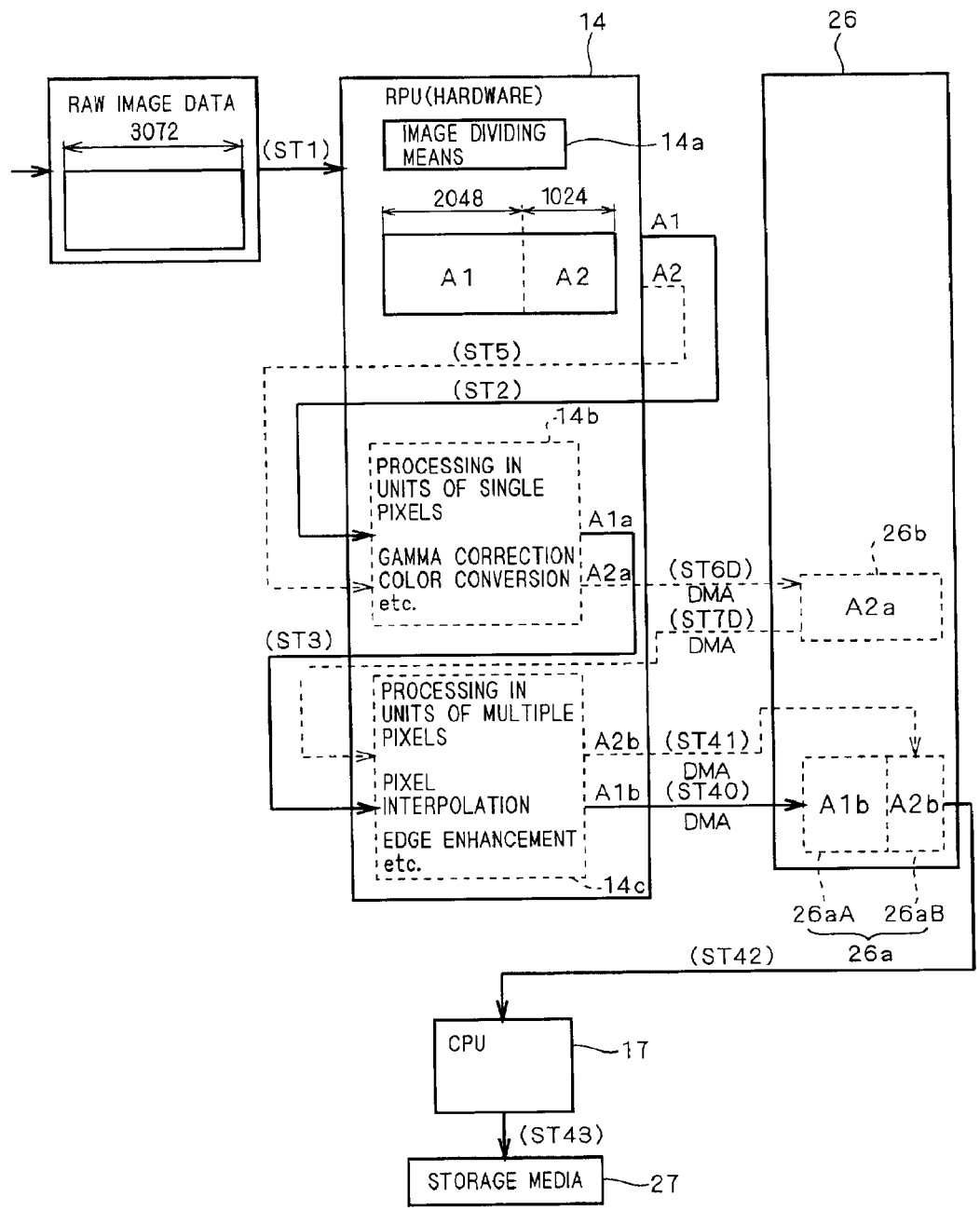
FIG. 5 is a schematic block diagram for illustrating an image processor according to an embodiment 3 of the present invention.

An embodiment 3 of the present invention is now described. FIG. 5 is a schematic block diagram for illustrating an image processor according to the embodiment 3. Referring to FIG. 5, blocks denoted by the same reference numerals as those in FIG. 3 are assumed to have functions similar to the above, and redundant description is omitted. This also applies to step numbers shown in FIG. 5.

Figure 6:
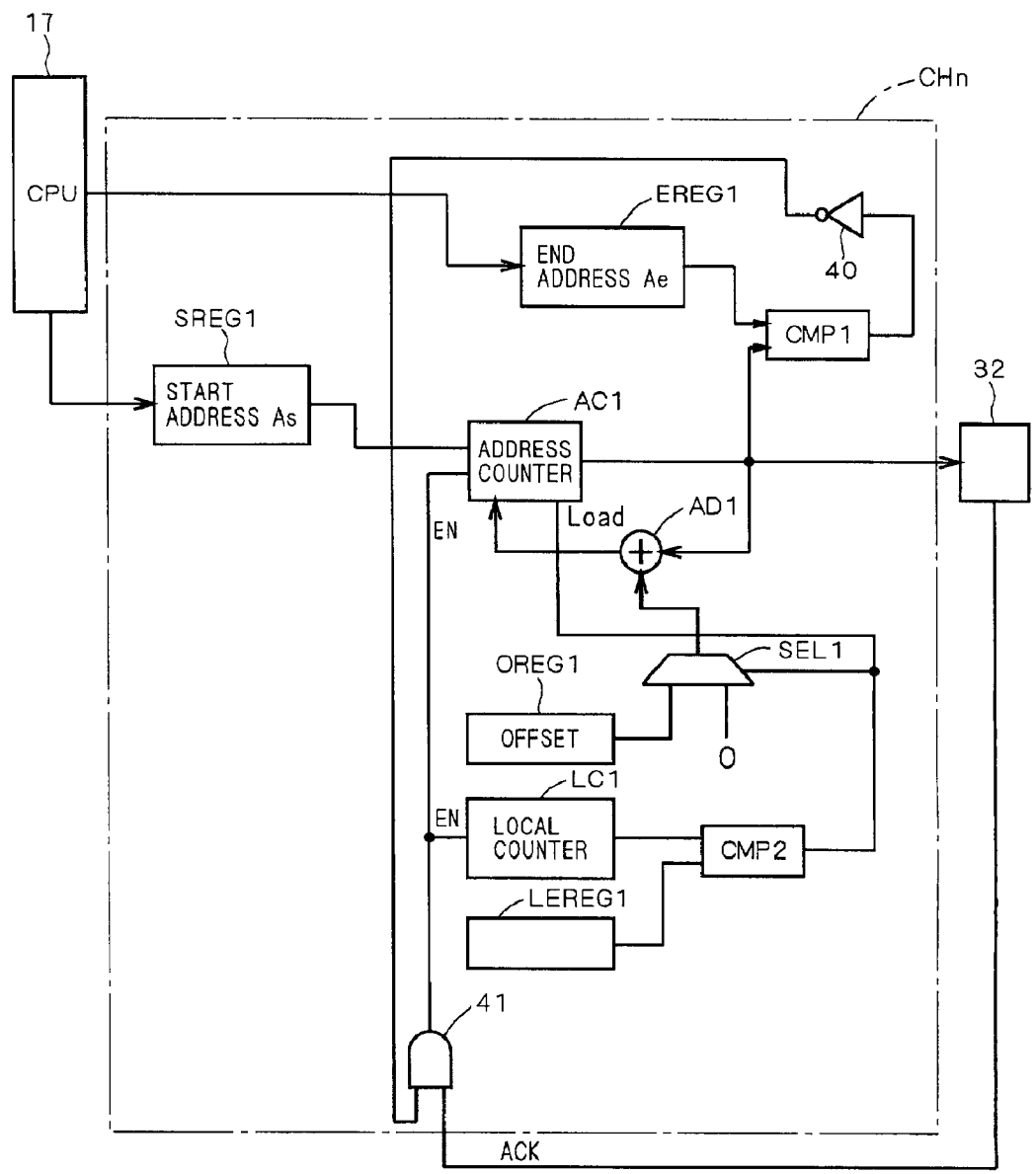
FIG. 6 is a block diagram of a DMA channel employed in the image processor according to the embodiment 3 of the present invention.

The feature of the embodiment 3 resides in that a circuit structure shown in FIG. 6 is employed for each of DMA channels CH0 and CH1 of a DMA controller 24. A DMA channel CHn (n: 0 or 1) shown in FIG. 6 comprises a register SREG1 storing a transfer start address as in a buffer area of a main memory 26 and another register ERGE1 storing a transfer end address Ae in the buffer area. The transfer start address As and the transfer end address Ae are transferred from a CPU 17 and stored in each register.

The DMA channel CHn also comprises an address counter AC1 generating/outputting an address on the buffer area by starting from the transfer start address As stored in the register SREG1 and sequentially incrementing the same up to the transfer end address Ae. The address output from the address counter AC1 is output to an arbiter 32, which in turn executes DMA transfer processing with the address. In this specification, the term "increment" stands for an operation of changing a quantity in a positive or negative direction.

A comparator CMP1 compares the address transmitted from the address counter AC1 with the transfer end address Ae stored in the register EREG1 for outputting a high-level comparison signal to an inverter 40 when the addresses match with each other, i.e., when the address reaches the transfer end address Ae, while outputting a low-level comparison signal to the inverter 40 when the addresses mismatch with each other. The inverter 40 outputs an inverted signal obtained by level-inverting the comparison signal to a logical AND element 41.

The DMA channel CHn further comprises a local counter LC1 executing counting synchronous with the operation of incrementing the address in the address counter AC1. A comparator CMP2 compares a count transmitted from the local counter LC1 with a final value stored in a register LEREG1, for outputting a high-level comparison signal to a selector SEL1 and the address counter AC1 when the values match with each other, i.e., when the count reaches the final value, while outputting a low-level comparison signal to the selector SEL1 and the address counter AC1 when the values mismatch with each other. The final value stored in the register LEREG1 is transferred from the CPU 17.

The selector SEL1 is controlled to select and output zero value when the received comparison signal is low while selecting and outputting an offset value stored in a register OREG1 when the comparison signal is high. The offset value stored in the register OREG1 is transferred from the CPU 17. An adder AD1 outputs an added value obtained by adding up the value transmitted from the selector SEL1 and the address transmitted from the address counter AC1 to the address counter AC1, thereby making the address counter AC1 generate an address starting from the added value. While the embodiment 3 employs the adder AD1 on the assumption that the address is incremented in the positive direction, the aforementioned adder AD1 is replaced with a subtracter when the address is incremented in the negative direction.

Operations of the DMA channel CHn are as follows: First, the CPU 17 transfers and stores the transfer start address As and the transfer end address Ae in a buffer area Bu of the main memory 26 shown in FIG. 7 to and in the registers SREG1 and EREG1 respectively. The CPU 17 also transfers the final value stored in the register LEREGI and the offset value stored in the register OREG1. Then, an operating signal ACK is input from the arbiter 32 through the logical AND element 41, which in turn outputs an enable signal EN obtained by ANDing the operating signal ACK with a high-level signal received from the comparator CMP1 to the address counter AC1. The address counter AC1 receiving the enable signal EN starts incrementing the address from the transfer start address As.

Figure 7:
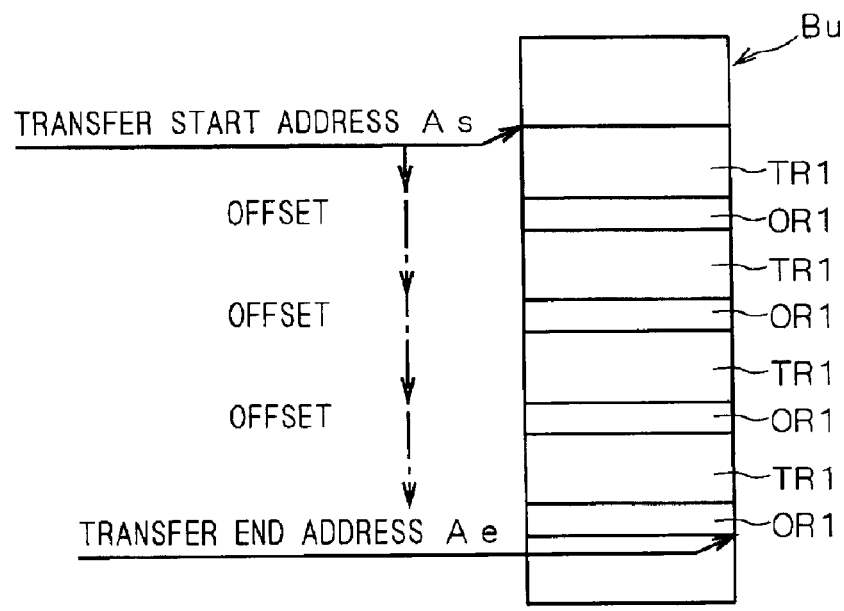
FIGS. 7 to 9 are explanatory diagrams schematically showing transfer processing by the DMA controller.

The local counter LC1 outputs a count obtained by count operation in synchronization with the incrementing operation of the address counter AC1 to the comparator CMP1, which in turn outputs a high-level comparison signal to the selector SEL1 when the count reaches the final value stored in the register LEREG1. At this time, the count of the local counter LC1 is reset to zero value. At this time, further, the selector SEL1 selects the offset value stored in the register OREG1 and outputs the same to the adder D1, while the address counter AC1 receiving the comparison signal reads the added value output from the adder AD1 and sequentially generates and outputs an address starting from this added value (address skipped (offset) by the offset value). As shown in FIG. 7, the address counter AC1 generates an address of an area TR1 until the count of the local counter LC1 reaches the final value, and generates an address of a subsequent area TR1 while skipping an offset area OR1 corresponding to the offset value when the count reaches the final value. When the address generated in the address counter AC1 finally reaches the transfer end address Ae, the inverter 40 outputs a low-level signal to the logical AND element 41 for stopping the transmission of the enable signal EN from the logical AND element 41 to the address counter AC1, so that the address counter AC1 stops the incrementing operation.

Image processing employing the DMA controller 24 having the DMA channel CHn is now described in detail with reference to FIG. 5.

As shown in FIG. 5, the DMA channel CH0 having the circuit structure shown in FIG. 6 is assigned to data transfer from multiple pixel processing means 14c to a first buffer area 26a at a step ST40 subsequent to a step similar to the aforementioned step ST3. To describe in detail, a head address As of the first buffer area 26a is transferred to the aforementioned register SREG1, and a final address Ae of the first buffer area 26a is transferred to the aforementioned register EREG1. Further, the final value indicating the length (hereinafter referred to as an address length) of an address area corresponding to 2048 horizontal pixels of divided image data A1 is transferred to the aforementioned register LEREG1, while the offset value indicating an address length corresponding to 1024 horizontal pixels of divided image data A2 is transferred to and stored in the aforementioned register OREG1.

Figure 8:
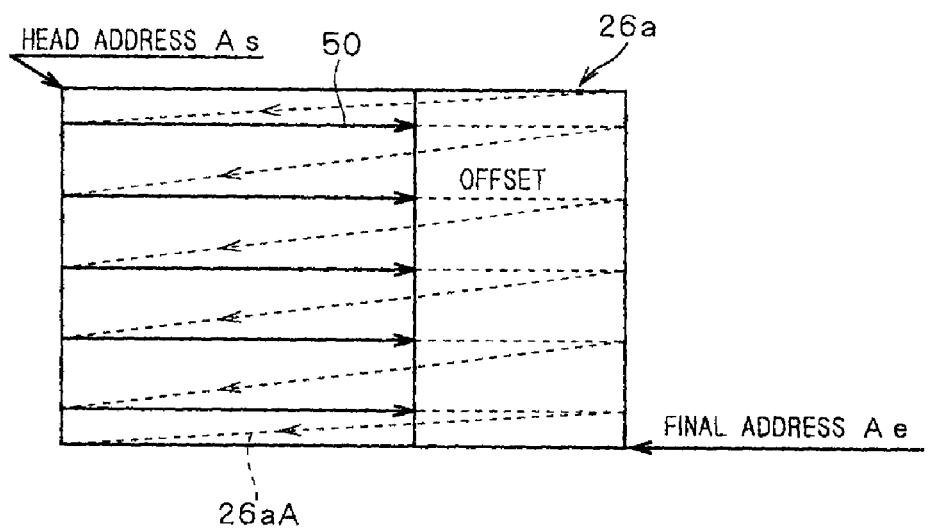

Thus, the address counter AC1 repeats operations of sequentially incrementing the address from the head address As of the first buffer area 26a along arrow 50 as shown in an exemplary diagram of FIG. 8 and offsetting the address area corresponding to 1024 horizontal pixels when the address reaches the final value of the address area corresponding to 2048 horizontal pixels. Therefore, a first area 26aA of the first buffer area 26a stores divided image data A1b having 2048 horizontal pixels.

At a subsequent step ST41, the DMA channel CH1 having the circuit structure shown in FIG. 6 is assigned to data transfer from the multiple pixel processing means 14c to the first buffer area 26a. To describe in detail, the transfer start address As obtained by adding the head address As of the first buffer area 26a and the address length corresponding to 2048 horizontal pixels is transferred to the aforementioned register SREG1, while the final address Ae of the first buffer area 26a is transferred to the aforementioned register EREG1. Further, the final value indicating the address length corresponding to 1024 horizontal pixels of the divided image data A2 is transferred to the aforementioned register LEREG1, while the offset value indicating the address length corresponding to 2048 horizontal pixels of the divided image data A1 is transferred to and stored in the aforementioned register OREG1.

Figure 9:
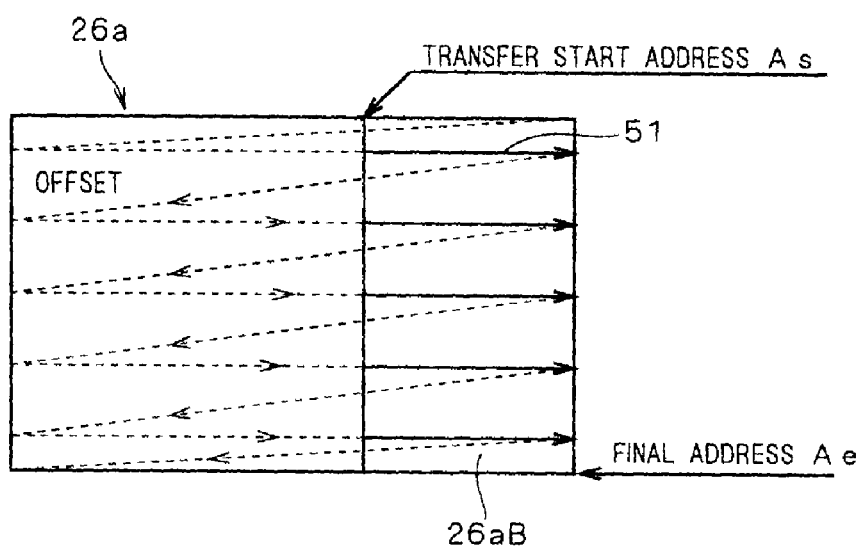
Figure 10:
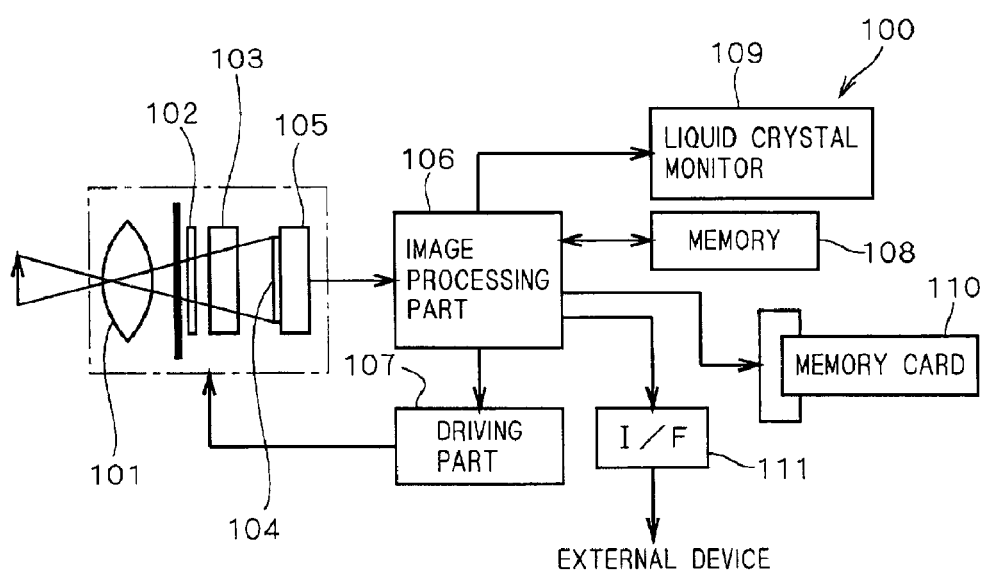
FIG. 10 is a schematic block diagram of a general digital still camera.
Figure 11:
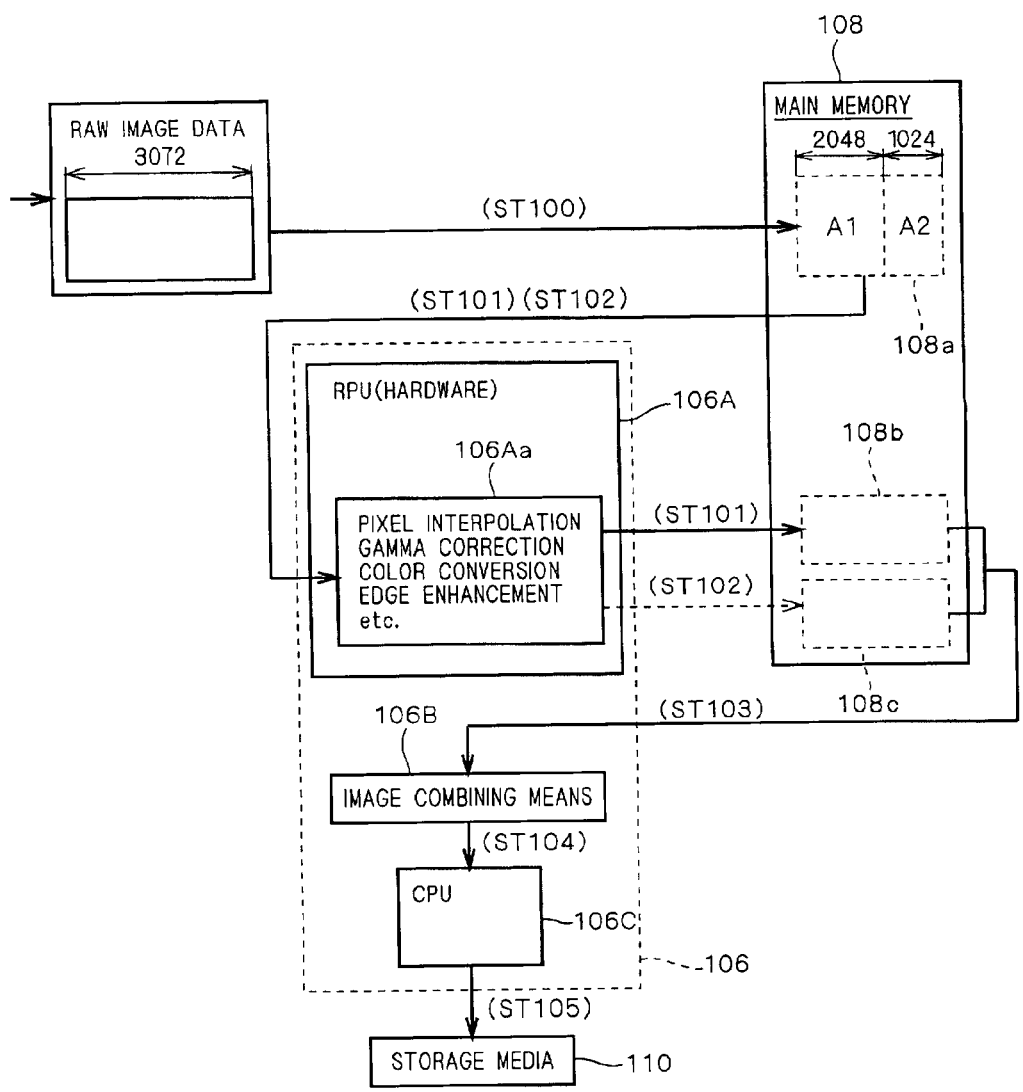
FIG. 11 is a block diagram for illustrating conventional image processing.

Thus, the address counter AC1 repeats operations of sequentially incrementing the address from the transfer start address As along arrow 51 as shown in an explanatory diagram of FIG. 9 and offsetting the address area corresponding to 2048 horizontal pixels when the address reaches the final value of the address area corresponding to 1024 horizontal pixels. Therefore, a second area 26aB of the first buffer area 26a stores divided image data A2b having 1024 horizontal pixels.

Thus, the first buffer area 26a stores combined image data having 3072 horizontal pixels obtained by combining the divided image data A1b and A2b with each other.

At a subsequent step ST42, the CPU 17 reads the combined image data stored in the first buffer area 26a and compression-codes the same in the JPEG system or the like, so that the compression-coded data is transferred to a card interface 27A and stored in a memory card 27 at a subsequent step ST43.

Thus, the image processing according to the embodiment 3 can combine the divided image data A1 and A2 divided by image dividing means 14a and thereafter processed in the single pixel processing mean 14b and the multiple pixel processing means 14c with each other into a single image when DMA-transferring the same to the first buffer area 26a, whereby no image combining means 31 is required dissimilarly to the embodiments 1 and 2 and the speed of image processing can be further increased.

While the invention has been shown and described in detail, the foregoing description is in all aspects illustrative and not restrictive. It is therefore understood that numerous modifications and variations can be devised without departing from the scope of the invention.

What is claimed is:

1. An image processor comprising an image processing circuit image-processing image data input therein and a main memory receiving and temporarily storing transferred said data processed in said image processing circuit, wherein said image processing circuit has a temporary storage area temporarily storing pixel data of a plurality of lines of said image data, image dividing means dividing said image data into divided image data storable in said temporary storage area, single pixel processing means executing image processing on said divided image data in units of single pixels and multiple pixel processing means executing image processing in units of multiple pixels after said temporary storage area stores said divided image data processed in said single pixel processing means, thus creating processed divided image data, and said main memory has a first buffer area storing first processed divided image data continuously processed in said single pixel processing means and said multiple pixel processing means among said divided image data, a second buffer area storing second processed divided image data processed in said single pixel processing means among said divided image data and a third buffer area storing data obtained by processing said second processed divided image data read from said second buffer area in said multiple pixel processing means, said image processor further comprising image combining means combining said first processed divided image data stored in said first buffer area and said data stored in said third buffer area with each other.

2. The image processor according to claim 1, wherein a CPU (central processing unit) controls data transfer between said main memory and said image processing circuit.

3. The image processor according to claim 1, further comprising a DMA (direct memory access) controller controlling data transfer between said main memory and said image processing circuit.

4. The image processor according to claim 3, wherein said DMA controller has at least two DMA channels, first said DMA channel is assigned to data transfer from said multiple pixel processing means to said first buffer area and second said DMA channel is assigned to data transfer from said single pixel processing means to said second buffer area.

5. The image processor according to claim 3, wherein said DMA controller has at least two DMA channels, first said DMA channel is assigned to data transfer from said second buffer area to said multiple pixel processing means and second said DMA channel is assigned to data transfer from said multiple pixel processing means to said third buffer area.

6. An image processor comprising an image processing circuit image-processing image data input therein, a main memory receiving and temporarily storing transferred said data processed in said image processing circuit and a DMA controller controlling data transfer between said main memory and said image processing circuit, wherein said image processing circuit has a temporary storage area temporarily storing pixel data of a plurality of lines of said raw image data, image dividing means dividing said image data into divided image data storable in said temporary storage area, single pixel processing means executing image processing on said divided image data in units of single pixels and multiple pixel processing means executing image processing in units of multiple pixels after said temporary storage area stores said divided image data processed in said single pixel processing means, thus creating processed divided image data, said main memory has a first buffer area storing first processed divided image data continuously processed in said single pixel processing means and said multiple pixel processing means among said divided image data and a second buffer area storing second processed divided image data processed in said single pixel processing means among said divided image data, said first buffer area also stores data obtained by processing said second processed divided image data read from said second buffer area in said multiple pixel processing means, and said DMA controller makes addressing when transferring said first and second processed divided image data to said first buffer area thereby combining the same into a single image and storing said single image.

7. The image processor according to claim 6, wherein said DMA controller comprises a DMA channel generating and outputting an address on said main memory and a memory control circuit executing data transfer between a storage element corresponding to said address output from said DMA channel and said image processing circuit, and said DMA channel comprises:

an address counter generating and outputting said address by sequentially changing the same from a prescribed start address in said first buffer area up to a prescribed end address in said first buffer area, a local counter performing counting in synchronization with sequential change of said address in said address counter, and an adder-subtracter outputting an added/subtracted value obtained by adding/subtracting a prescribed offset value to/from said address output from said address counter when a count output from said local counter reaches a prescribed final value to said address counter thereby making said address counter change said address from said added/subtracted value.

* * * * *